United States Patent
Beamer et al.

[11] Patent Number: 5,810,513
[45] Date of Patent: Sep. 22, 1998

[54] METHOD AND APPARATUS FOR PREVENTING TRENCH OVERFLOWS BEHIND TRENCH LINERS

[75] Inventors: John V. Beamer; Kimberly B. Olsoni, both of Atlanta, Ga.

[73] Assignee: Hoosier Group LLC, Atlanta, Ga.

[21] Appl. No.: 715,132

[22] Filed: Sep. 17, 1996

[51] Int. Cl.$^6$ .................................................. E02B 5/00
[52] U.S. Cl. ........................... 405/119; 405/4; 405/118
[58] Field of Search .................................. 405/118, 119, 405/121, 270; 404/2, 4

[56] References Cited

U.S. PATENT DOCUMENTS

| | | | |
|---|---|---|---|
| 2,771,745 | 11/1956 | Bramble | 405/270 |
| 3,113,435 | 12/1963 | Yount | 405/270 |
| 3,383,863 | 5/1968 | Berry | 405/270 |
| 3,415,022 | 12/1968 | Schaefer et al. | 405/270 X |
| 3,735,596 | 5/1973 | Stephenson | 405/121 |
| 3,854,292 | 12/1974 | Nienstadt | 405/270 |
| 4,940,359 | 7/1990 | Van Duyn et al. . | |
| 4,993,877 | 2/1991 | Beamer . | |
| 4,993,878 | 2/1991 | Beamer . | |
| 5,000,621 | 3/1991 | Beamer . | |
| 5,066,165 | 11/1991 | Wofford et al. . | |
| 5,181,793 | 1/1993 | Dekel . | |
| 5,213,438 | 5/1993 | Barenwald . | |
| 5,256,000 | 10/1993 | Beamer . | |
| 5,281,052 | 1/1994 | Beamer . | |
| 5,326,189 | 7/1994 | Beamer . | |
| 5,326,190 | 7/1994 | Beamer . | |

Primary Examiner—Dennis L. Taylor
Attorney, Agent, or Firm—Needle & Rosenberg, P.C.

[57] ABSTRACT

A flexible trench liner system used for forming a single or a dual containment trench where during a trench overflow, the liquid run-off is prevented from migrating behind the primary flexible liner or behind the secondary flexible liner and possibly leaking onto the trench walls and bottom. The system includes an upper portion on the flexible liner means that overlaps at least a portion of the bearing surface of the trench. The overlapping upper portion of the flexible liner can be part of the primary liner and/or the secondary liner. The flexible liner means are held against the trench walls and the bearing surface by a holding means.

19 Claims, 4 Drawing Sheets

METHOD AND APPARATUS FOR PREVENTING TRENCH OVERFLOWS BEHIND TRENCH LINERS

BACKGROUND OF THE INVENTION

1. Field of the Invention

The present invention relates to the construction industry and, more specifically, to an improved trench lining system.

2. Description of the Prior Art

The general concept of trench drainage has long been used. Trenches are used where liquid run-offs occur, such as chemical plants, food processing operations, pulp and paper mills, pharmaceutical manufacturing, bottling plants, in parking garages and parking areas of shopping centers. The fluid from a trench generally goes into a catch basin or sewer large enough to release the material from the trench as it arrives. The top of the trench is normally covered with a slotted grate to allow entrance of the fluids, catching of debris, load carrying capacity for whatever may pass over it and, in some applications, they are solidly covered, such as crossing sidewalks or where conduits are carried within the trench and fluid entry is minimal and not necessarily desirable.

The liquid run-off in a trench may overflow. There exists trench systems made of rigid materials. In these systems, the rigid liners are held together with an annular space between them. A piece of thermoplastic, such as polypropylene or polyetheylene or other material, is used to seal the opening between the primary and secondary liners thus preventing overflowing trenches from getting behind a liner or liners. Such systems are the ACROLINE systems manufactured and sold by Agru of Austria, A-4540 Bad Hall, Ing.-Pesendorfer Street 19–23, Austria and BEKAPLAST systems manufactured and sold by Steuler of Germany, Georg-Steuler Strasse 175, D-56203, Hohr-Grenzhausen, Germany. For trench systems which are constructed from flexible liners where the liners are allowed to expand and contract independently of each other, there does not exist a system for preventing the liquid run-off to escape behind the flexible liners. Such a system is needed to prevent any possible overflow from leaking behind the liners onto the trench walls and bottom and between the primary and secondary liners. Thus, there exists a world-wide need for an economical means and method to line a trench into a single or double containment trench and prevent the escape of liquid run-off during overflows.

SUMMARY OF THE INVENTION

The disadvantages of the prior art are overcome by the present invention, which relates to overflowing trenches and prevents the liquid run-off migrating behind and between the liners and possibly leaking onto the trench walls and bottom surface.

The present invention is a trench liner system for forming a single or dual containment trench and for relining an existing trench having at least two walls, a bottom surface, and a bearing surface adjacent each of the tops of the side walls. One embodiment for a single containment trench comprises a primary liner means, with an interior surface and an exterior surface, extending along the length of the trench and disposed within the trench. This embodiment may include a means disposed between the primary liner means and the trench walls for separating the exterior surface of the primary liner means from the trench walls. Migration of the liquid run-off to the exterior surface of the liner means is prevented by the upper portion of the liner means which overlies a portion of each of the bearing surfaces.

For a dual containment trench, the embodiments comprise of a secondary liner means, with an interior surface and an exterior surface, extending along the length of the trench; and a primary liner means, having an interior surface and an exterior surface, disposed within the trench within the secondary liner means and extending along the length of the trench. This embodiment may also include a means disposed between the secondary liner means and the primary liner means for separating the interior surface of the secondary liner means from the exterior surface of the primary liner means.

Migration of the liquid run-off behind the liners is prevented by the liner means having upper portions that overlap portions of each of the bearing surfaces. One embodiment includes an upper portion on the primary liner means alone, another embodiment includes an upper portion on the secondary liner means alone, and a further embodiment includes upper portions on both the primary liner means and the secondary liner means.

All these embodiments, for both single containment and dual containment, include a means for holding the primary liner means and the separating means or the primary liner means, the separating means, and the secondary liner means against the trench walls and bearing surface so as to allow each upper portion of either the primary liner means or the secondary liner means or both to overlap at least a portion of the bearing surface. The separating means and holding means are basically the same as those disclosed in my copending applications Ser. No. 08/287,654 filed on Aug. 9, 1994; Ser. No. 08/349,901 filed on Dec. 6, 1994; Ser. No. 08/404,586 filed on Mar. 15, 1995; and Ser. No. 08/584,170 filed on Jan. 11, 1996.

The present invention also comprises a method of lining an existing trench, having a bottom, at least two walls and a bearing surface adjacent each of the tops of the side walls. To line a single containment trench, a primary liner means is placed along the length of the trench or a separator means and a primary liner means are placed along the length of the trench. The upper portion of the primary liner means overlies at least a portion of each of the bearing surfaces of the trench. A holding means is then installed to hold the liner means against the trench walls with the upper portion of the liner means overlapping at least a portion of each of the bearing surfaces.

For a dual containment trench, a secondary liner is first placed in the trench. A separating means may be then be disposed within the secondary liner means and the primary liner means is disposed within the separating means, if used, or within the secondary liner means. The upper portions of either or both liner means is/are placed so that it/they overlie at least a portion of each of the bearing surfaces of the trench. A holding means is then installed to hold the liner means against the trench walls with the upper portion(s) of the liner means overlapping at least a portion of each of the bearing surfaces of the trench.

The trench containment unit is extremely flexible along its length, allowing continuous walls with no joints for two hundred feet or more. The trench containment unit should be an unbroken unit as long as possible to minimize the number of joints which might leak. The primary and secondary liners can have a neutral grade or be sloping as needed.

Therefore, it is an object of the present invention to provide an improved lining system and method for lining a containment trench.

It is also an object of the present invention to prevent liquid run-off during trench overflows to migrate outside and between the liners.

These and other objects will become apparent from the following description of the preferred embodiment taken in conjunction with the following drawings, although variations and modifications may be effected without departing from the spirit and scope of the novel concepts of the disclosure.

DETAILED DESCRIPTION OF THE PREFERRED EMBODIMENTS

Figure 1:
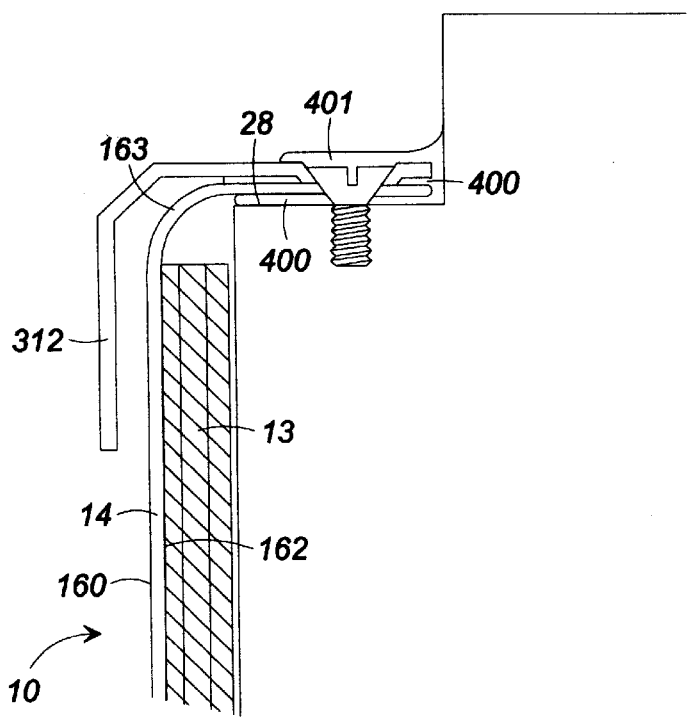
FIG. 1 is a cross-sectional side view of a single containment trench with the primary liner means overlapping at least a portion of the bearing surface.

A preferred embodiment of the invention is now described in detail. Referring to the drawings, like numbers indicate like parts throughout the views.

Figure 6:
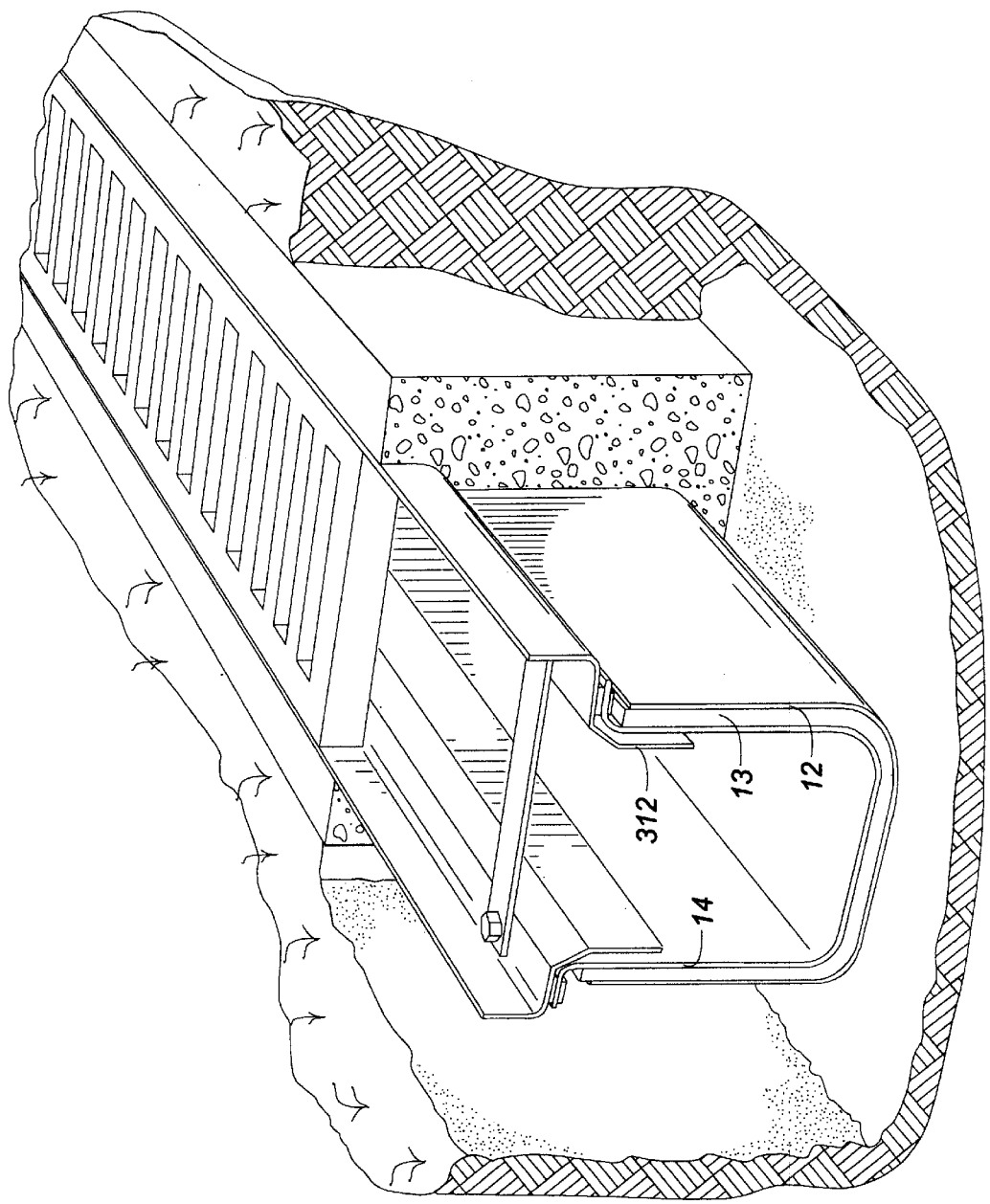
FIG. 6 is a perspective view of a double containment trench according to one form of the present invention, depicted in situ.

The present invention is basically the trench liner systems described in my copending applications Ser. No. 08/287,654 filed on Aug. 9, 1994; Ser. No. 08/349,901 filed on Dec. 6, 1994; Ser. No. 08/404,586 filed on Mar. 15, 1995; and Ser. No. 08/584,170 filed on Jan. 11, 1996, with the addition of a means for preventing liquid run-off from migrating behind and between the flexible liners. The invention relates to both a single and a double containment trench. For single containment, the liner means is extended to overlie at least a portion of each of the bearing surfaces of the trench. For double containment, either the primary liner means, the secondary liner means, or both are extended to overlie at least a portion of each of the bearing surfaces. An overall view of one embodiment of the trench liner system of the present invention is shown, in situ, by FIG. 6.

FIG. 1 shows a preferred embodiment of the present invention 10 for a single containment trench which comprises a separating means 13 disposed within an existing trench having at least two walls, a bottom and a bearing surface 28 adjacent each of the walls (the separating means 13 is the same as described in my copending applications Ser. No. 08/287,654 filed on Aug. 9, 1994; Ser. No. 08/349,901 filed on Dec. 6, 1994; Ser. No. 08/404,586 filed on Mar. 15, 1995; Ser. No. 08/584,170 filed on Jan. 11, 1996; and Ser. No. 08/680,966 filed on Jul. 16, 1996. Within the trench, a primary liner means 14 rests within the separating means 13 and has an upper portion 163, an interior surface 160 and an exterior surface 162, disposed along the length of the trench. The primary liner means 14 comprises a flexible material (i.e., plastic, metal, or any other flexible material) that is resistant to the fluids which the trench is designed to hold. The upper portion 163 of the primary liner means 14 overlies a portion of each of the bearing surfaces 28 for preventing an overflow of liquid run-off within the trench to migrate to the exterior surface of the primary liner means 14.

This embodiment may include a holding means 312 adapted to hold the primary liner means 14 and the separating means 13 against the trench walls so as to allow the primary liner means 14 to expand and contract along its length. Embodiments of the holding means 312 are described in my copending applications Ser. No. 08/287,654 filed on Aug. 9, 1994; Ser. No. 08/349,901 filed on Dec. 6, 1994; Ser. No. 08/404,586 filed on Mar. 15, 1995; Ser. No. 08/584,170 filed on Jan. 11, 1996; and Ser. No. 08/680,966 filed on Jul. 16, 1996.

A holding means 312 may be used to hold the primary liner means 14 against the trench walls and the bearing surface 28 so as to allow the primary liner means 14 to expand and contract along its length. Embodiments of the holding means 312 are described in my copending applications Ser. No. 08/287,654 filed on Aug. 9, 1994; Ser. No. 08/349,901 filed on Dec. 6, 1994; Ser. No. 08/404,586 filed on Mar. 15, 1995; Ser. No. 08/584,170 filed on Jan. 11, 1996; and Ser. No. 08/680,966 filed on Jul. 16, 1996.

A sealant 400 may be placed between the bearing surface and the primary liner means and between the primary liner means 14 and the holding means 312 to better hold in place the upper portion 163 of the primary liner means 14 and to further protect against any liquid run-off from seeping through or migrating to the exterior surface 162 of the primary liner means 14. A coating 401 may also be placed on top of the holding means 312 to further prevent any liquid run-off from seeping through or migrating to the exterior surface 162 of the primary liner means 14.

Figure 2:
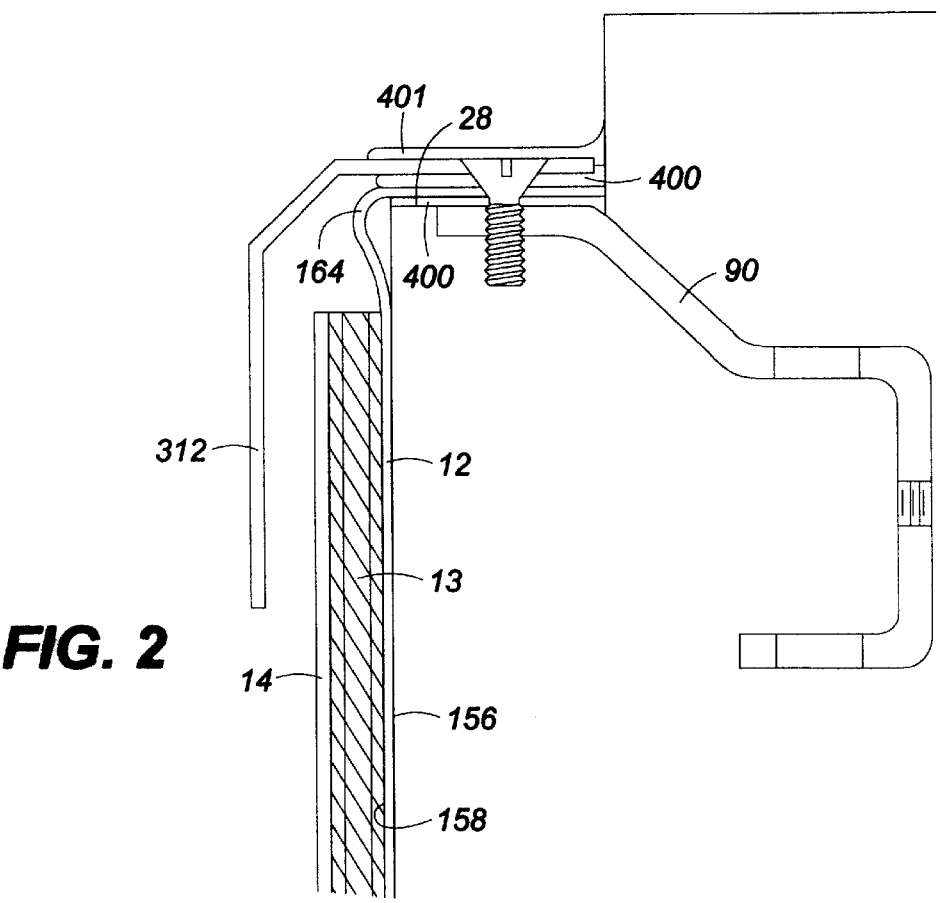
FIG. 2 is a cross-sectional side view of a double containment trench with the secondary liner means overlapping at least a portion of the bearing surface.

FIG. 2 shows another embodiment of the present invention for a double containment trench with a secondary liner means 12. In this embodiment, the secondary liner means 12 is disposed within and along the length of the trench, with the separating means 13 disposed within the secondary liner means 12 and the primary liner means 14 being disposed within the separating means 13 within the secondary liner means 12. The secondary liner means 12 is flexible and also comprises a material that is resistant to the fluids which the trench is designed to hold. The secondary liner means 12 has an upper portion 164, an interior surface 158 and an exterior surface 156, disposed along the length of the trench. The upper portion 164 of the secondary liner means 12 overlies at least a portion of each of the bearing surfaces 28 for preventing an overflow to migrate to the exterior surface 156 of the secondary liner means 12.

A holding means 312 and an anchor stand 90 may be used to hold the secondary liner means 12, the separating means 13, and the primary liner means 14 against the trench walls. Embodiments of the holding means 312 and anchor stand 90 are described in my copending applications Ser. No. 08/287,654 filed on Aug. 9, 1994; Ser. No. 08/349,901 filed on Dec. 6, 1994; Ser. No. 08/404,586 filed on Mar. 15, 1995; Ser. No. 08/584,170 filed on Jan. 11, 1996, and Ser. No. 08/680,966 filed on Jul. 16, 1996.

A sealant 400 may be placed between the bearing surface and the upper portion 164 of the secondary liner means 12 and between the secondary liner means 12 and the holding means 312 to better hold in place the upper portion 164 of the secondary liner means 12 and to further protect against any liquid run-off from seeping through or migrating to the exterior surface 156 of the secondary liner means 12. A coating 401 may also be placed on top of the holding means 312 to further prevent any liquid run-off from seeping through or migrating to the exterior surface 156 of the secondary liner means 12.

Figure 3:
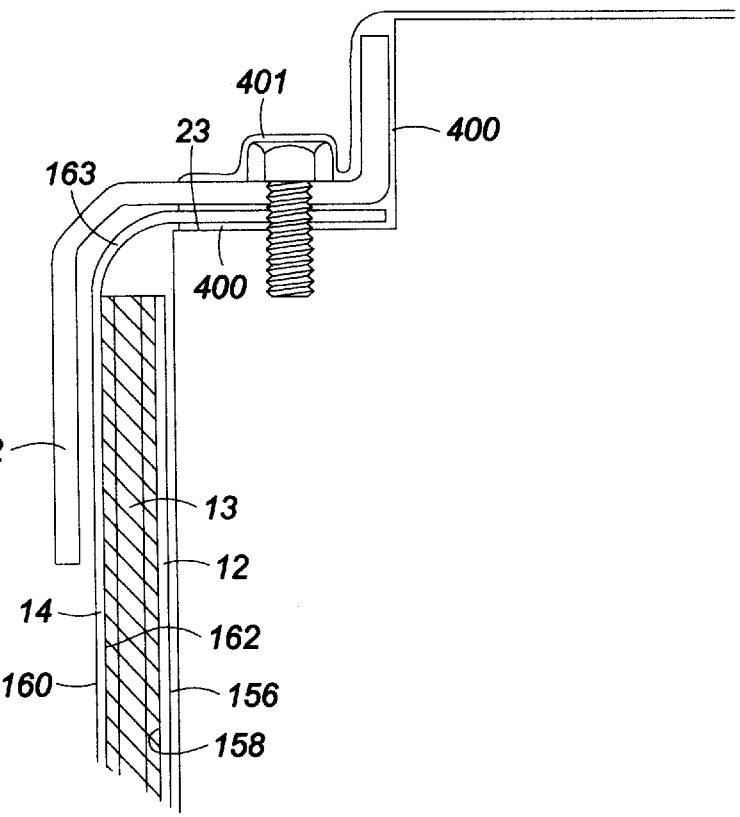
FIG. 3 is a cross-sectional side view of a double containment trench with the primary liner means overlapping at least a portion of the bearing surface.

FIG. 3 shows another embodiment for a double containment trench. In this embodiment, the upper portion 163 of the primary liner means 14 overlies at least a portion of each of the bearing surface 23 to prevent an overflow within the trench to migrate to the exterior surface 156 of the secondary liner means 12.

Figure 4:
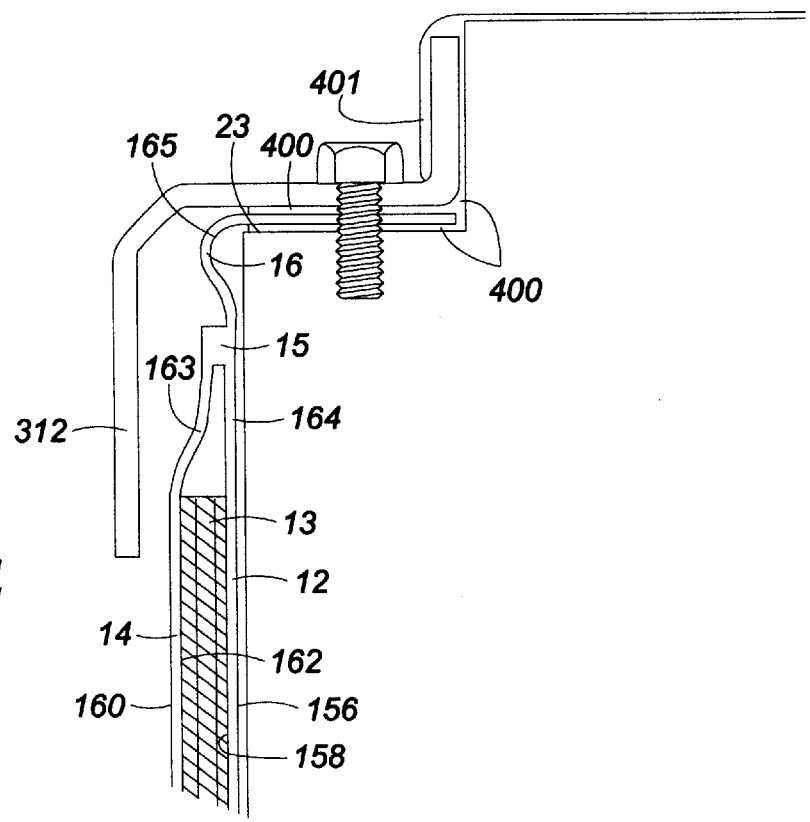
FIG. 4 is a cross-sectional side view of a double containment trench with the primary liner means and the secondary liner means joined to, and overlapping, at least a portion of the bearing surface.

FIG. 4 shows yet another embodiment for a double containment trench in which the upper portion 164 of the secondary liner means 12 and the upper portion 163 of the primary liner means 14 are joined 15 to form one liner section 16. Joining together of the means 12 14 may be accomplished by welding, using sealants, or mechanical means on the upper portions 163, 164 of the liner means 12, 14. Liner section 16 has an upper section 165 that overlies at least a portion of each the bearing surfaces 23 to prevent an overflow to migrate to the exterior surface 156 of the secondary liner means 12.

Figure 5:
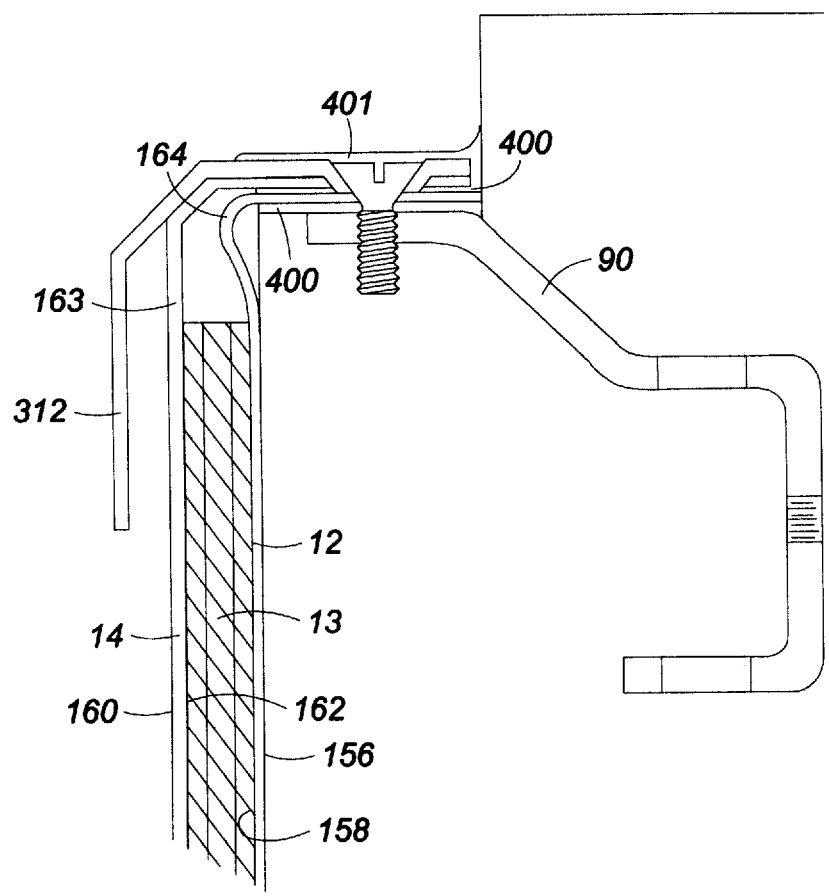
FIG. 5 is a cross-sectional side view of a double containment trench with both the primary liner means and the secondary liner means overlapping at least a portion of the bearing surface.

FIG. 5 shows another embodiment for a double containment trench. In this embodiment, the upper portion 164 of the secondary liner means 12 overlies at least a portion of each of the bearing surfaces 23. The upper portion 163 of the primary liner means 14 overlies the upper portion 164 of the secondary liner means 12.

The present invention also comprises a method of lining an existing trench, having a bottom, at least two walls and a bearing surface adjacent each of the tops of the side walls. As shown in FIG. 1, to line a single containment trench, a separator means 13 and a primary liner means 14 are placed along the length of the trench. The upper portion 163 of the primary liner means 14 overlies at least a portion of each of the bearing surfaces 28 of the trench. A holding means 312 is then installed to hold the liner means against the trench walls with the upper portion of the primary liner means 14 overlapping at least a portion of each of the bearing surfaces 28.

For a dual containment trench, as shown in FIG. 2, a secondary liner means 12 is placed along the length of the trench. A separating means 13 may then be disposed within the secondary liner means 12 and the primary liner means 14 is disposed within the separating means 13. As shown in FIGS. 2, 3 and 5, the upper portions 164, 163 of either or both liner means is/are placed so that it/they overlie at least a portion of each of the bearing surfaces of the trench 28. A holding means 312 is then installed to hold the liner means against the trench walls with the upper portion(s) 164, 163 of the liner means overlapping at least a portion of each of the bearing surfaces of the trench 28. In FIG. 4, the upper portions 163, 164 of the primary liner means 14 and the secondary liner means 12 are joined 15 to form a liner section 16 having an upper section 165. The upper section 165 is placed so that it overlies at least a portion of each of the bearing surfaces 28.

The above embodiments are given as illustrative examples and are not intended to impose any limitations on the invention. It will be readily appreciated that many deviations may be made from the specific embodiments disclosed in this specification without departing from the invention. Accordingly it is intended to cover all such modifications as within the scope of this invention.

What is claimed is:

1. A trench liner system for lining a trench having at least two walls, a bottom surface, and a bearing surface adjacent each of the tops of the side walls, comprising: a secondary liner means having an interior surface and an exterior surface, the secondary liner means being disposed within and alone the trench; and a primary liner means having an interior surface, an exterior surface and an upper portion, the primary liner means being disposed within and along the trench within the secondary liner means; wherein the primary liner means and the secondary liner means are allowed to expand and contract independently from each other, and wherein the upper portion of the primary liner overlies a portion of each of the bearing surfaces for preventing an overflow of fluid within the primary liner means to migrate to the exterior surface of the primary liner means.

2. The system of claim 1 wherein the primary liner means is flexible.

3. The system of claim 2, further comprising:
   a. means disposed between the primary liner means and the secondary liner means for separating the primary liner means from the secondary liner means; and
   b. means for holding at least the primary liner means against the trench walls and the bearing surface.

4. The system of claim 3, further comprising a means for attaching the bearing surface to the upper portion of the primary liner means.

5. The system of claim 4 further comprising a means for attaching the upper portion of the primary liner means to the holding means.

6. A trench liner system for lining a trench having at least two walls, a bottom surface, and a bearing surface adjacent each of the tops of the side walls, comprising: a secondary liner means with an interior surface, an exterior surface, and an upper portion, the secondary liner means extending along the length of the trench; and a primary liner means having an interior surface and an exterior surface, the primary liner means disposed within the secondary liner means and extending along the length of the trench; wherein the primary liner means and the secondary liner means are allowed to expand and contract independently from each other, and wherein the upper portion of the secondary liner means overlies a portion of each of the bearing surfaces for preventing an overflow of fluid within the trench to migrate to the exterior surface of the secondary liner means.

7. The system of claim 6, further comprising:
   a. means disposed between the secondary liner means and the primary liner means for separating the interior surface of the secondary liner means from the exterior surface of the primary liner means; and
   b. means for holding at least the primary liner means against the trench walls.

8. A trench liner system for lining a trench having at least two walls, a bottom surface, and a bearing surface adjacent each of the tops of the side walls, comprising:
   a. secondary liner means, with an interior surface, an exterior surface, and an upper portion, the secondary liner means extending along the length of the trench and the upper portion of the secondary liner means overlapping a portion of each of the bearing surfaces for preventing an overflow to migrate to the exterior surface of the secondary liner means; and
   b. primary liner means, having an exterior surface, an interior surface, and an upper portion, the primary liner means disposed within the trench within the secondary liner means and extending along the length of the trench, wherein the primary liner means and the secondary liner means are allowed to expand and contract independently from each other, and wherein the upper portion of the primary liner means overlies the upper portion of the secondary liner means for preventing an overflow of fluid within the trench to migrate to the exterior surface of the primary liner means.

9. The system of claim 8, and further comprising:

a. means disposed between the secondary liner means and the primary liner means for separating the interior surface of the secondary liner means from the exterior surface of the primary liner means; and b. means for holding at least the primary liner means against the trench walls.

10. A trench liner system for lining a trench having at least two walls, a bottom surface, and a bearing surface adjacent each of the tops of the side walls, comprising:

a. secondary liner means, with an interior surface, an exterior surface, and an upper portion, the secondary liner means extending along the length of the trench; and b. primary liner means, having an interior surface, an exterior surface, and an upper portion, the primary liner means disposed within the trench within the secondary liner means, wherein the primary liner means and the secondary liner means are allowed to expand and contract independently from each other, the upper portion of the primary liner means and the upper portion of the secondary liner means forming a liner section having an upper section, and wherein the upper section of the liner section overlies a portion of each of the bearing surfaces.

11. The system of claim 10, further comprising:

a. means disposed between the secondary liner means and the primary liner means for separating the interior surface of the secondary liner means from the exterior surface of the primary liner means; and b. means for holding at least the primary liner means against the trench walls.

12. A method of lining a trench, having at least two walls, a bottom surface, and a bearing surface adjacent each of the tops of the side walls, comprising the steps of:

a. placing a secondary liner means, having an exterior surface and an interior surface along the length of the trench;

b. Placing a primary liner means, having an exterior surface, an interior surface, and an upper portion, within the secondary liner means along the length of the trench, wherein the primary liner means and the secondary liner means are allowed to expand and contract independently from each other; and c. placing said upper portion of said primary liner means over a portion of each of the top bearing surfaces for preventing an overflow of fluid within the primary liner means to migrate to the exterior surface of the primary liner means.

13. A method of lining a trench, having at least two walls, a bottom, and a bearing surface adjacent each of the tops of the side walls, comprising the steps of:

a. placing a secondary liner means, having an exterior surface, an interior surface, and an upper portion along the length of the trench to provide secondary containment trench;

b. placing said upper portion of the secondary liner means over at least a portion of the bearing surface for preventing an overflow of fluid to migrate to the exterior surface of the secondary liner means; and c. placing a primary liner, having an exterior surface and an interior surface, along the length of the trench within the secondary liner means, wherein the primary liner means and the secondary liner means are allowed to expand and contract independently from each other.

14. A method of lining a trench, having at least two walls, a bottom, and a bearing surface adjacent each of the tops of the walls, comprising the steps of:

a. placing a secondary liner means, having an exterior surface, an interior surface, and an upper portion along the length of the trench to provide secondary containment trench;

b. placing a primary liner means, having an exterior surface, an interior surface, and an upper portion along the length of the trench within the secondary liner means, wherein the primary liner means and the secondary liner means are allowed to expand and contract independently from one another, and wherein said upper portion of the secondary liner means and said upper portion of the primary liner means form a liner section having an upper section; and c. placing said upper section of the liner section over a portion of each of the bearing surfaces for preventing an overflow of fluid to migrate to the exterior surface of the secondary liner means.

15. The method of claim 12, further comprising placing a separating means between the primary liner means and the secondary liner means.

16. The method of claim 13, further comprising placing a separating means between the primary liner means and the secondary liner means.

17. The method of claim 13, wherein said primary liner further comprises an upper portion, and wherein said method further comprises the step of placing said upper portion of the primary liner means over at least a portion of the upper portion of the secondary liner means for preventing an overflow of fluid to migrate to the exterior surface of the primary liner means.

18. The method of claim 17, further comprising placing a separating means between the primary liner means and the secondary liner means.

19. The method of claim 14, further comprising placing a separating means between the primary liner means and the secondary liner means.

* * * * *